(12) United States Patent
Rhodes

(10) Patent No.: US 7,467,316 B2
(45) Date of Patent: Dec. 16, 2008

(54) SYSTEM FOR CLOCK SYNCHRONIZATION FOR MODULES IN AN ANALYTICAL DEVICE

(75) Inventor: Robert P. Rhodes, Lincoln University, PA (US)

(73) Assignee: Agilent Technologies, Inc., Santa Clara, CA (US)

( * ) Notice: Subject to any disclaimer, the term of this patent is extended or adjusted under 35 U.S.C. 154(b) by 491 days.

(21) Appl. No.: 11/311,544

(22) Filed: Dec. 19, 2005

(65) Prior Publication Data

US 2007/0143641 A1 Jun. 21, 2007

(51) Int. Cl.
*G06F 1/00* (2006.01)
*G06F 1/12* (2006.01)
*G06F 13/42* (2006.01)
*H04L 7/00* (2006.01)

(52) U.S. Cl. .................. 713/400; 713/401; 713/500

(58) Field of Classification Search .................. 713/400
See application file for complete search history.

(56) References Cited

U.S. PATENT DOCUMENTS

| 5,135,549 | A  | * | 8/1992  | Phillips et al. | ............... | 95/8    |
|-----------|----|---|---------|-----------------|----------------|---------|
| 6,836,851 | B2 | * | 12/2004 | Dive            | ............... | 713/400 |
| 7,205,815 | B2 | * | 4/2007  | Park            | ............... | 327/291 |
| 7,343,437 | B2 | * | 3/2008  | Kynast et al.   | ............... | 710/110 |

\* cited by examiner

*Primary Examiner*—Thuan N Du
*Assistant Examiner*—Michael J Brown (57) ABSTRACT

A system for synchronizing clock signals in an analytical device includes a first module including a timing command generator configured to generate a command signal, the command signal related to a master clock signal, and a second module including a command interpreter configured to generate a timing reference signal related to the command signal and a local clock signal. The second module includes a clock generator configured to receive the timing reference signal and the local clock signal and is configured to adjust a timing output of the second module so that the timing of the second module is synchronized to the master clock signal.

18 Claims, 8 Drawing Sheets

SYSTEM FOR CLOCK SYNCHRONIZATION FOR MODULES IN AN ANALYTICAL DEVICE

BACKGROUND

A chemical analysis device, such as a gas or liquid chromatograph, is a complex instrument that generally includes a computer (or control portion), a number of inlets and fluid paths, and one or more detectors. The control portion is typically coupled to the detectors and to pneumatic control electronics through a multi-conductor cable. The multiple conductors in the cable are used to supply power, ground, timing, and a number of different control and data signals. Typically, the cable includes forty or more conductors. Because such a cable is required for each detector, or other peripheral device, the chromatograph is typically limited to a fixed number of connection points for detectors and peripheral devices. Further, it is common to use a printed circuit (PC) board to PC board connection between the control electronics and the detector, thus requiring a fixed spatial relationship between the control electronics and the detector.

There are many events that occur in a chromatograph that require signal timing alignment between and among the control electronics, detectors and peripheral devices. For example, the timing of the generation of a detector signal depends on other processes occurring in the chromatograph, such as injection time and temperature control. Accordingly, the control electronics typically includes a master timing reference, referred to as a master clock. All runtime events in the chromatograph should occur relative to the master clock signal. For example, the control signal used to initiate the analog-to-digital conversion in the detector must be sent to each detector at a precise time. Unfortunately, this requires a separate conductor for each detector.

Advances in connection architecture for the components of a chromatograph use fewer conductors than in previous arrangements. Such an architecture makes use of multiplexing technology to place multiple control signals on two conductors using a bi-directional differential serial communication methodology. Such architecture minimizes the number of conductors in the interconnect cable and also facilitates expansion and system flexibility by eliminating the PC board-to-PC board connection of previous systems. However, the use of a bi-directional differential serial communication methodology creates timing synchronization difficulties because dedicated conductors are not available to allow the timing elements in the peripheral modules to synchronize with the master clock.

Therefore, it would be desirable to have the ability to synchronize multiple peripheral devices with a master clock using a differential serial communication methodology.

SUMMARY OF THE INVENTION

According to an embodiment, a system for synchronizing clock signals in an analytical device includes a first module including a timing command generator configured to generate a command signal, the command signal related to a master clock signal, and a second module including a command interpreter configured to generate a timing reference signal related to the command signal and a local clock signal. The second module includes a clock generator configured to receive the timing reference signal and the local clock signal and is configured to adjust a timing output of the second module so that the timing of the second module is synchronized to the master clock signal.

Other methods and embodiments of the invention will be discussed with reference to the figures and to the detailed description of the preferred embodiments.

BRIEF DESCRIPTION OF THE FIGURES

The invention will be described by way of example, in the description of exemplary embodiments, with particular reference to the accompanying figures.

DETAILED DESCRIPTION

While described below as used in a gas chromatograph, the timing synchronization system in accordance with one embodiment of the present invention can be used in any analysis device where it is desirable to synchronize in time multiple peripheral devices with a master clock over a limited number of conductors. Further, while described below as useful for synchronizing the operation of an analog-to-digital converter in a detector to a master runtime clock in a chromatograph, the timing synchronization system in accordance with one embodiment of the present invention can be used to synchronize other devices.

Figure 1:
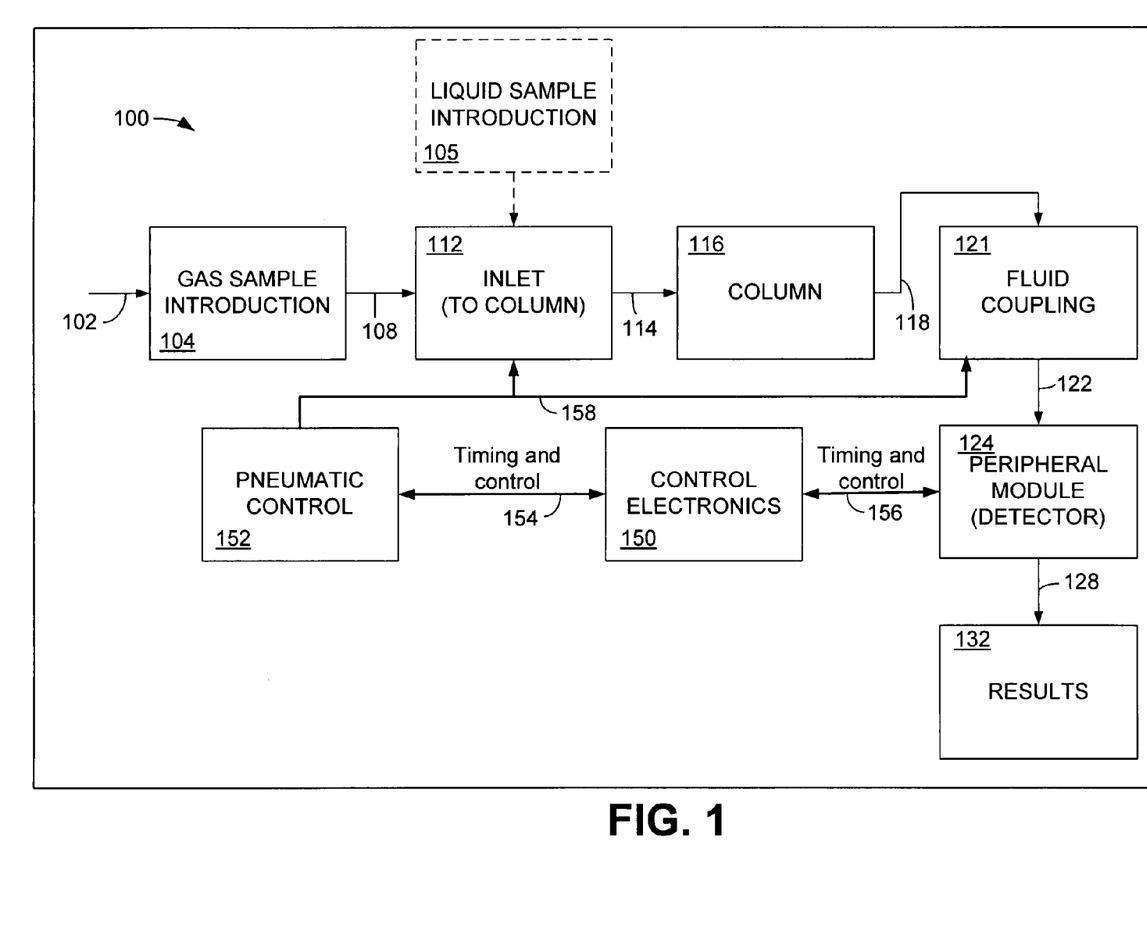
FIG. 1 is a block diagram illustrating a simplified analytical device, which is one possible device in which the timing synchronization system of the invention may be implemented.

FIG. 1 is a block diagram illustrating a simplified analytical device 100, which is one possible device in which the timing synchronization system in accordance with one embodiment of the present invention may be implemented. The elements shown in FIG. 1 do not constitute a complete chromatograph. Rather, the elements in FIG. 1 illustrate an example of a system in which the timing synchronization system in accordance with one embodiment of the present invention can be implemented. In one embodiment, the analytical device may be a gas chromatograph (GC) and may include a detector, such as a flame ionization detector. Other detectors that may be used include, for example, a thermal conductivity detector, an electron capture detector and a nitrogen phosphorous detector.

The gas chromatograph 100 includes a means of introducing a sample. A sample can be introduced as a gas via any of several devices known to those skilled in the art. For example, a sample may be introduced via a sample valve 104 which receives a sample of material to be analyzed via connection 102 and provides the sample via connection 108 to, for example, the inlet 112 of a gas chromatograph. Liquid samples can also be introduced in a number of ways. For example, a liquid autosampler 105 might be used to directly introduce a liquid sample into the inlet 112. The inlet 112 is typically connected to a chromatographic column 116. The sample is transferred from the inlet 112 to a chromatographic column 116 via connection 114. The output of the chromatographic column 116 is coupled via connection 118 to a fluid coupling 121. The fluid coupling 121 can be used to couple a capillary tube, such as a chromatographic column 116, or any other tubing to another element within the analytical device 100. In FIG. 1, the fluid coupling 121 is used to couple the chromatographic column 116 to a peripheral module 124, such as a flame ionization detector.

A control electronics module 150 is coupled to the peripheral module 124 via connection 156 and to a pneumatic control module 152 via connection 154. The connections 154 and 156 can be, for example, bi-directional serial communication links that enable multiplexed communication between the control electronics module 150 and the peripheral modules to which it is coupled. As used herein, the connections 154 and 156 will also be referred to as communication links. The pneumatic control module 152 is coupled to the inlet 112 and fluid coupling 121 via connection 158. The pneumatic control module 152 controls the operation of the various fluid paths in the analytical device 100. The control electronics module 150 controls the timing and other functions of the pneumatic control module 152 and the peripheral module 124. Further, other peripheral devices may be coupled to the control electronics module 150. The connections 154 and 156 can be, in this example, simplified bidirectional differential serial communication links that facilitate the addition of other peripheral modules. As will be described in detail below, to perform timing control and synchronization, the control electronics module 150 provides a particular pattern of data to the peripheral module 124 and to the pneumatic control module 152 over the communication links 156 and 154, although only the peripheral module 124 will be described in detail. In an embodiment, the timing synchronization system is implemented in the control electronics 150 and the peripheral module 124 of FIG. 1.

Figure 2:
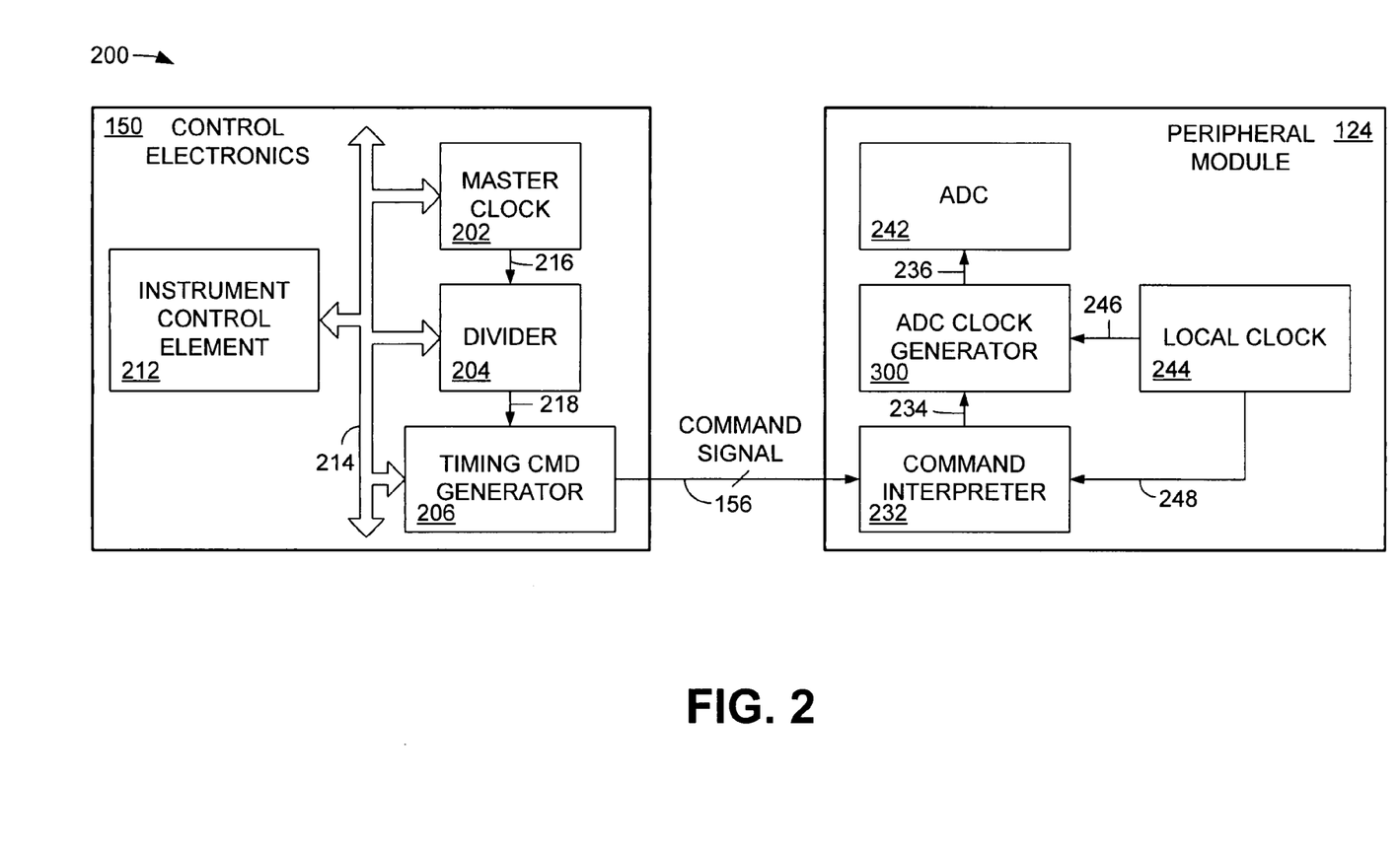
FIG. 2 is a block diagram of the control electronics module and the peripheral module of FIG. 1.

FIG. 2 is a block diagram 200 of the control electronics module 150 and the peripheral module 124 of FIG. 1. The control electronics module 150 includes an instrument control element 212, an oscillator 202 that generates a master clock signal, a divider 204 and a timing command generator 206, all coupled via a communication bus 214. The instrument control element 212 provides the general control signals to the peripheral module 124 via the timing command generator 206 and the communication link 156. In addition, as will be described below, the timing command generator provides a command signal to the peripheral module 124. Further, a single control electronics module 150 may communicate with a number of different peripheral modules.

The master clock 202 provides a master clock signal to the counter 204 via connection 216. The divider 204 divides the master clock signal to one or more lower frequency signals and provides these lower frequency signals to the instrument control element 212 for control of various elements, and to the timing command generator, which generates a relatively low frequency command signal in the form of a command bit stream. In one example, the master clock frequency is divided down from 60 MHz to 50 Hz by the divider 204. The 50 Hz signal, also referred to as a "timing edge" signal, is used by the timing command generator 206 to generate a command signal. The command signal is a relatively low frequency bit stream that includes a number of command characters and a stop bit, that is used as a timing edge reference point. The operation of the divider 204 and the timing command generator 206 will be described in greater detail below. The timing command generator 206 supplied the command signal via communication link 156 to the peripheral module 124.

The peripheral module 124 includes a command interpreter 232, a local clock oscillator 244 that provides a local clock signal, an analog-to-digital converter (ADC) clock generator 300 and an ADC 242. The peripheral module 124 also includes other elements, depending on the desired function. In FIG. 2, for simplicity, only the components of the peripheral module 124 that are used to describe the concepts of the timing synchronization system are shown.

The command interpreter 232 receives the command signal from the timing command generator 206 and receives a local clock signal from the local clock oscillator 244 via connection 248. The frequency of the local clock signal is typically different than the frequency of the master clock signal. In this example, the local clock signal is at a frequency of 50 MHz. The command interpreter 232 generates a timing reference signal, also referred to herein as a "time tick." The time tick is a timing reference signal, the timing of which is related to the timing edge of the command signal supplied via connection 156. The generation of the timing reference signal will be described in greater detail below. The timing reference signal is supplied to the ADC clock generator 300 via connection 234. The ADC clock generator 300 also receives the local clock signal via connection 246. The ADC clock generator 300 develops an ADC clock signal that is accurately synchronized to the master clock signal in the control electronics module 150. The ADC clock generator 300 will be described in detail below.

Figure 3:
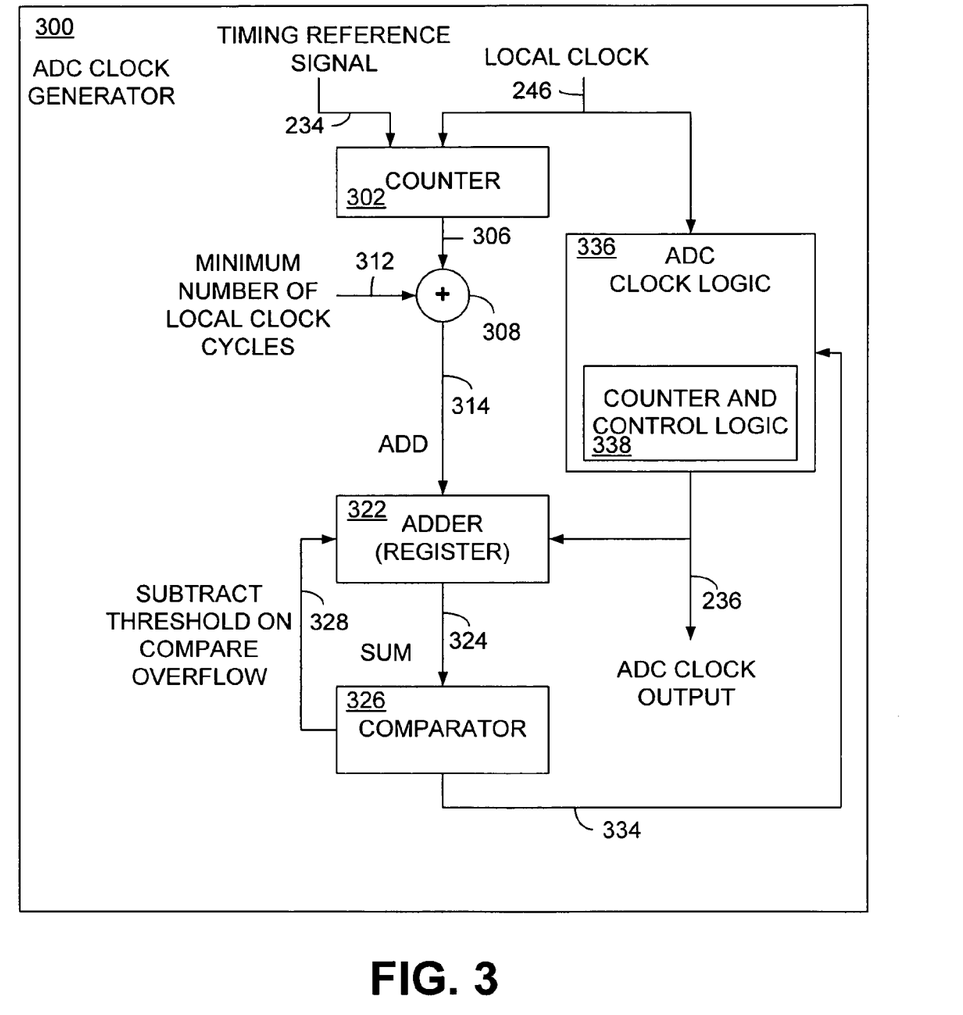
FIG. 3 is a block diagram illustrating the ADC clock generator of FIG. 2.

FIG. 3 is a block diagram illustrating the ADC clock generator of FIG. 2. The timing reference signal is supplied via connection 234 to a counter 302. The local clock signal on connection 246 is also supplied to the counter 302. The counter 302 determines the number of local clock cycles that occur between pulses of the timing reference signal. The timing reference signal is used to read the final count from a previous period and to then initialize (zero) the counter 302 and begin counting the next period. In this manner, each timing reference signal pulse is measured.

A minimum number of local clock cycles is determined based on the specifications of the oscillators 202 and 244 that generate the master clock signal and the local clock signal, respectively, and the requirement of the ADC 242 (FIG. 2). A value representing the minimum number of local clock cycles is supplied on connection 312 to the adder 308. At the slowest expected local clock frequency and at the highest expected master clock frequency, there will be a minimum number of local clock cycles between pulses of the timing reference signal. The minimum number of local clock cycles is chosen so that the excess number of local clock cycles is always greater than zero. The excess number of local clock cycles is described below. The minimum number of local clock cycles is also chosen so that the maximum number of excess local clock cycles is less than a threshold value. The threshold value is equal to the number of ADC clock cycles that occur between cycles of the timing reference signal and will be described below.

An adder 308 subtracts the minimum number of local clock cycles from the counted local clock cycles to determine a number of excess local clock cycles. The signal representing the number of excess local clock cycles is provided on connection 314. The signal on connection 314 represents the number of excess clock cycles that will be apportioned over the time between cycles of the timing reference signal. The number of excess local clock cycles is determined for each period between pulses of the timing reference signal. An excess local clock cycle is apportioned by adding it to one of the ADC clock cycles, thus extending the period of the ADC clock cycle by one cycle. This will be illustrated below.

The excess clock cycles on connection 314 are added to a register 322 on each ADC clock cycle. The ADC clock cycle signal is provided to the register 322 from the ADC clock logic 336 via connection 236. When the sum in the register 322 reaches a threshold value, the ADC clock cycle is extended by an extra local clock cycle for that ADC clock cycle period. The threshold is a constant that is calculated based on the number of ADC clock cycles that are needed to consume the excess local clock cycles. The threshold value is equal to the number of ADC clock cycles that occur between cycles of the timing reference signal. The comparator 326 can be implemented in digital logic as a digital comparator, which compares the value in the register 322 with the threshold value. When the value on connection 324 exceeds the threshold value, the value in the register 322 is reduced by the threshold value by a signal sent from the comparator 326 to the register 322 via connection 328. After the value of the register 322 is reduced by the threshold value, any remainder, which refers to the remaining number of excess local clock cycles, in the register 322 is retained in the register 322 and applied to a subsequent cycle. For example, if the threshold value is 18 clock cycles and the register reaches 20 excess local clock cycles, the ADC clock signal is modified to include an extra length pulse, thus consuming one extra local clock cycle. At the same time, the value of 18 is subtracted from 20, leaving a remainder of two excess local clock pulses in the register 322. This remainder stays in the register, where excess local clock cycles continue to accumulate. In this manner, timing differences between the local clock and the master clock are compensated on an on-going basis.

The threshold is determined to accommodate for the range of excess local clock cycles expected. When the output of the comparator 326 is a logic low, the ADC clock logic 336 generates an ADC clock pulse based on the local clock signal on connection 246. However, when the output of the comparator 326 is logic high, the output of the comparator 326 on connection 334 causes the ADC clock logic 336 to apportion the excess local clock cycle over an ADC clock cycle, as described above. The ADC clock logic 336 includes counter and control logic 338.

Figure 4:
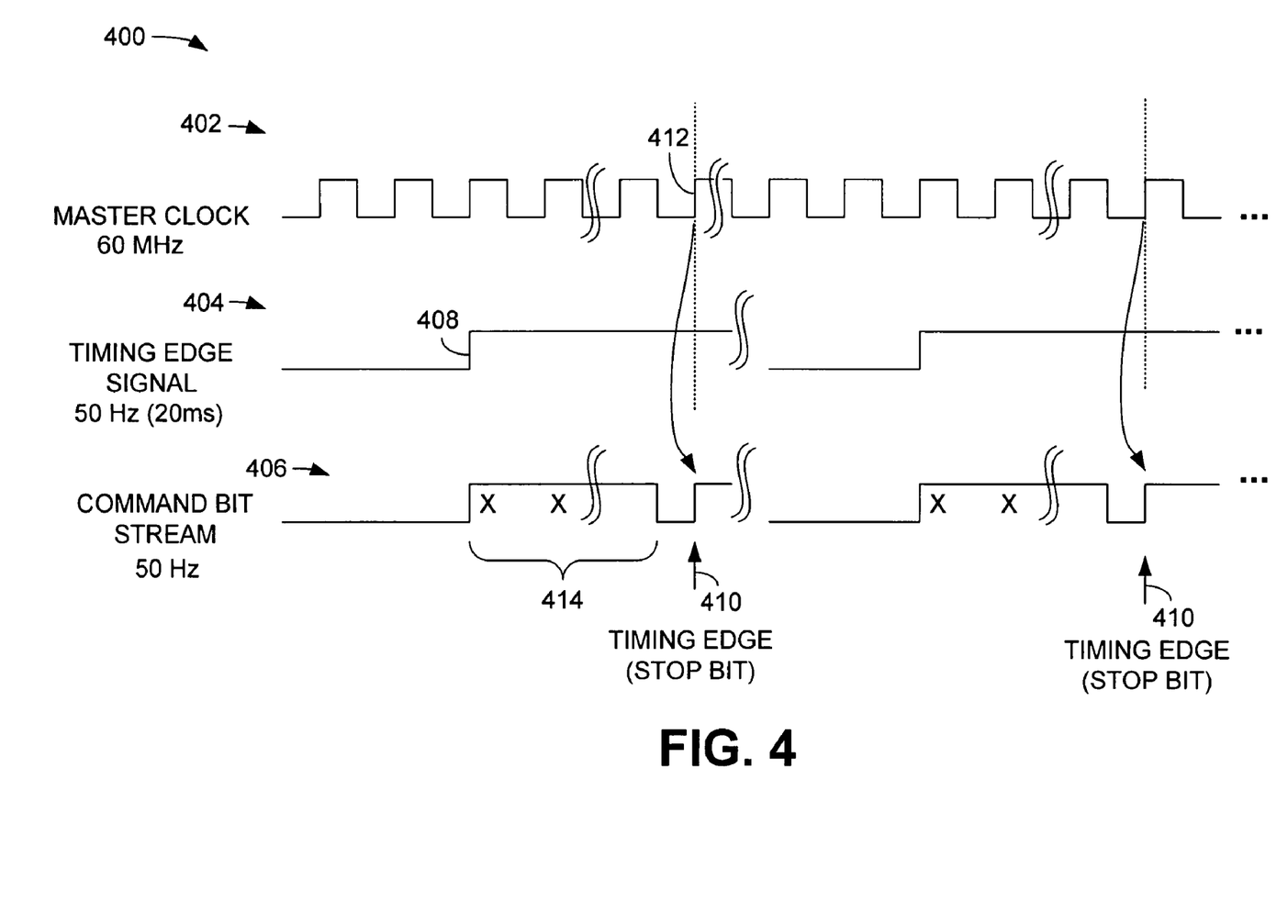
FIG. 4 is a timing diagram illustrating the generation of the command signal.

FIG. 4 is a timing diagram 400 illustrating the generation of the command signal. The command signal is generated by the timing command generator 206 (FIG. 2). The master clock signal is shown at 402. The frequency of the master clock signal (60 MHz) is divided down to a frequency of, in this example, 50 Hz by the divider 204 (FIG. 2), and is shown as the timing edge signal 404. A rising edge 408 of the timing edge signal 404 initiates the creation of the command signal 406. The command signal, also referred to as the command bit stream, is shown using reference numeral 406. The command signal 406 is also at a frequency of, in this example, 50 Hz, and includes one or more command characters 414, the presence of which is detected by the peripheral module 124. The presence of the command characters 414 instructs the peripheral module 124 that the command signal 406 is being received.

The command signal 406 also includes a timing edge 410, also referred to as a "stop bit," following the command characters 414. In accordance with an embodiment of the invention, the timing edge 410 of the command signal 406 is synchronized to a pulse 412 of the master clock signal 402. The alignment of the timing edge 410 of the command signal 406 with the pulse 412 of the master clock signal 402 ensures that the timing reference signal, to be described below, is accurately generated with respect to the master clock signal 402. The number of master clock cycles between the rising edge 408 of the timing edge signal 404 and the timing edge 410 of the command signal 406 is always the same. It should be noted that any pulse of the master clock signal 402 can be aligned with any timing edge signal 410 in the command signal 406.

Figure 5:
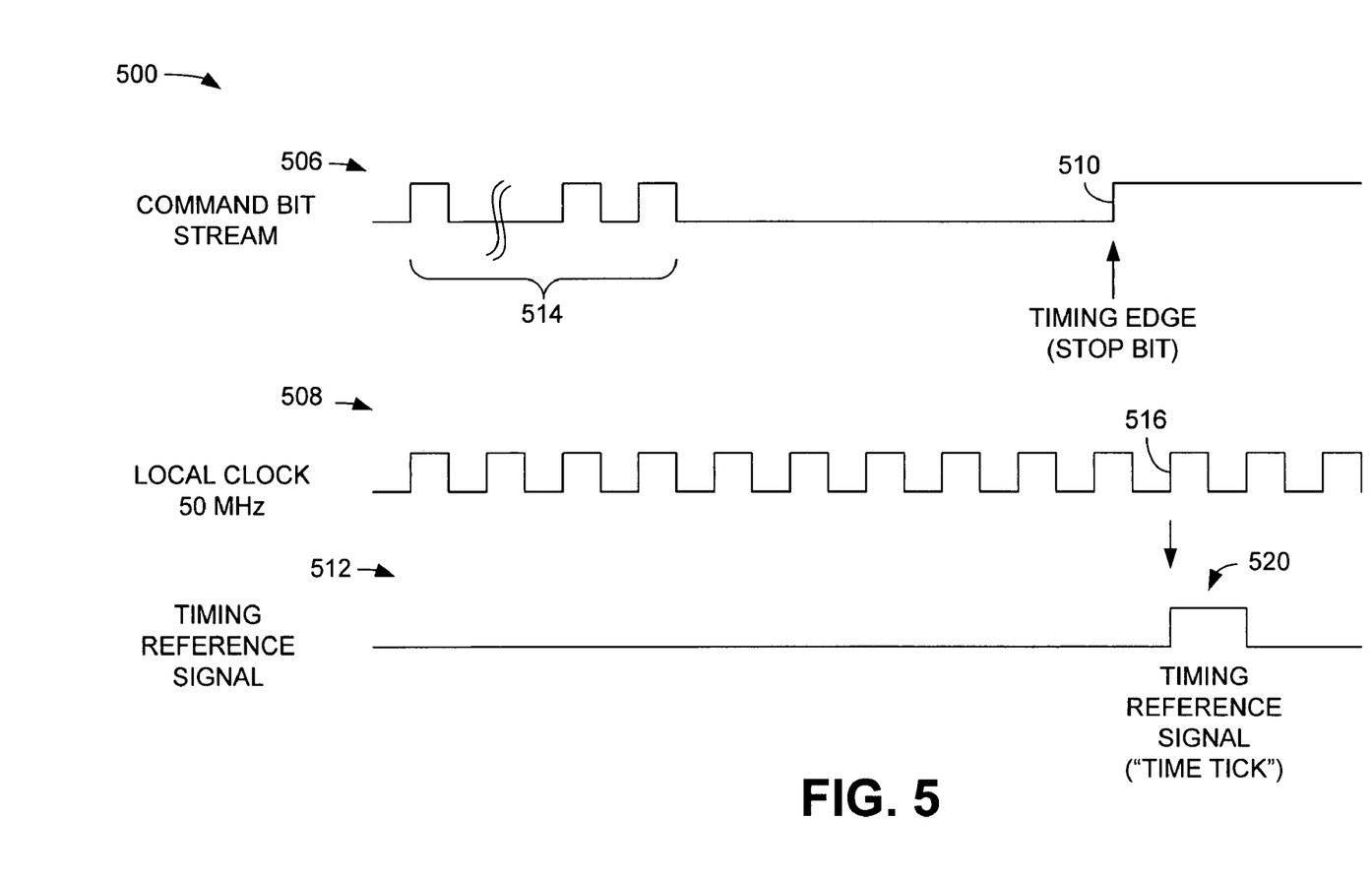
FIG. 5 is a timing diagram illustrating the generation of the timing reference signal.

FIG. 5 is a timing diagram 500 illustrating the generation of the timing reference signal. The timing reference signal is generated by the command interpreter 232 in the peripheral module 124. The command signal is shown using reference numeral 506. The command signal 506 is similar to the command signal 406. The command interpreter 232 recognizes the command signal 506 by recognizing the presence of the command characters 514. The timing edge of the command signal 506 is illustrated using reference numeral 510. The local clock signal produced by the local oscillator 244 (FIG. 2) is shown using reference numeral 508. The timing reference signal is illustrated using reference numeral 512. After the command characters are recognized, the timing reference signal stays in an idle state until the command interpreter 232 (FIG. 2) generates a pulse 520, which is also referred to as the time tick, on the rising edge of the local clock cycle after the receipt of the timing edge 510. The pulse 520 is generated on the rising edge 516 of the local clock signal 508 following the timing edge 510. Alternatively, the pulse 520, and all timing events discussed herein, may occur on the falling edge of the local clock signal 508 and the master clock signal 402 (FIG. 4).

Figure 6:
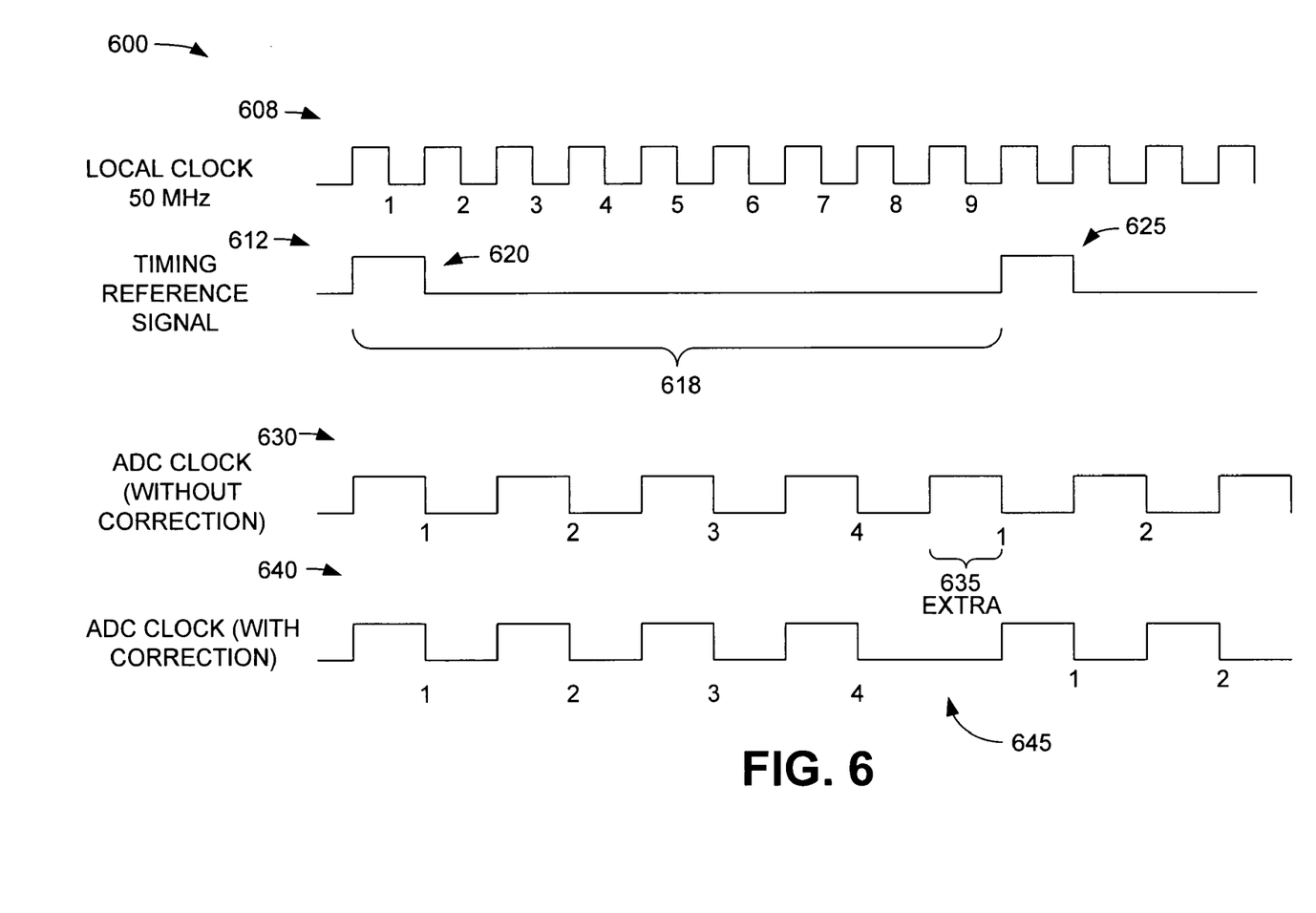
FIG. 6 is a timing diagram illustrating the generation of the ADC clock correction signal.

FIG. 6 is a timing diagram 600 illustrating the generation of the ADC clock correction signal. The ADC clock correction signal is generated by the ADC clock generator 300 in the peripheral module 124. The local clock signal produced by the local oscillator 244 (FIG. 2) is shown using reference numeral 608. The local clock signal 608 is similar to the local clock signal 508. The timing reference signal is illustrated using reference numeral 612. The timing reference signal 612 is similar to the timing reference signal 512. The number of local clock cycles that occur between pulses 620 and 625 of the timing reference signal 612 is determined using the counter 302 (FIG. 3). In this example, nine (9) local clock cycles occur between pulses 620 and 625. In this example, and without any correction, four ADC clock cycles occur between pulses 620 and 625, as shown in the non-corrected ADC clock signal 630. However, because nine (9) local clock cycles occur between pulses 620 and 625, an extra half-cycle, shown using reference numeral 635, will occur in the non-corrected ADC clock cycle 630 and cause an error in the ADC clock and will likely cause an error in the results of the chromatographic analysis.

In accordance with an embodiment of the invention, the ADC clock generator 300 will extend the period of one of the ADC clock cycles, shown using reference numeral 645, so that four ADC clock pulses are provided between pulses 620 and 625 of the timing reference signal 612. The corrected, or modified, ADC clock signal 640 compensates for the extra cycle 635. By extending one of the cycles in the ADC clock signal 640, the frequency of the ADC clock signal is adjusted to match the desired number of ADC clock pulses, in this example, four ADC clock pulses per timing reference signal time period 618.

Figure 7:
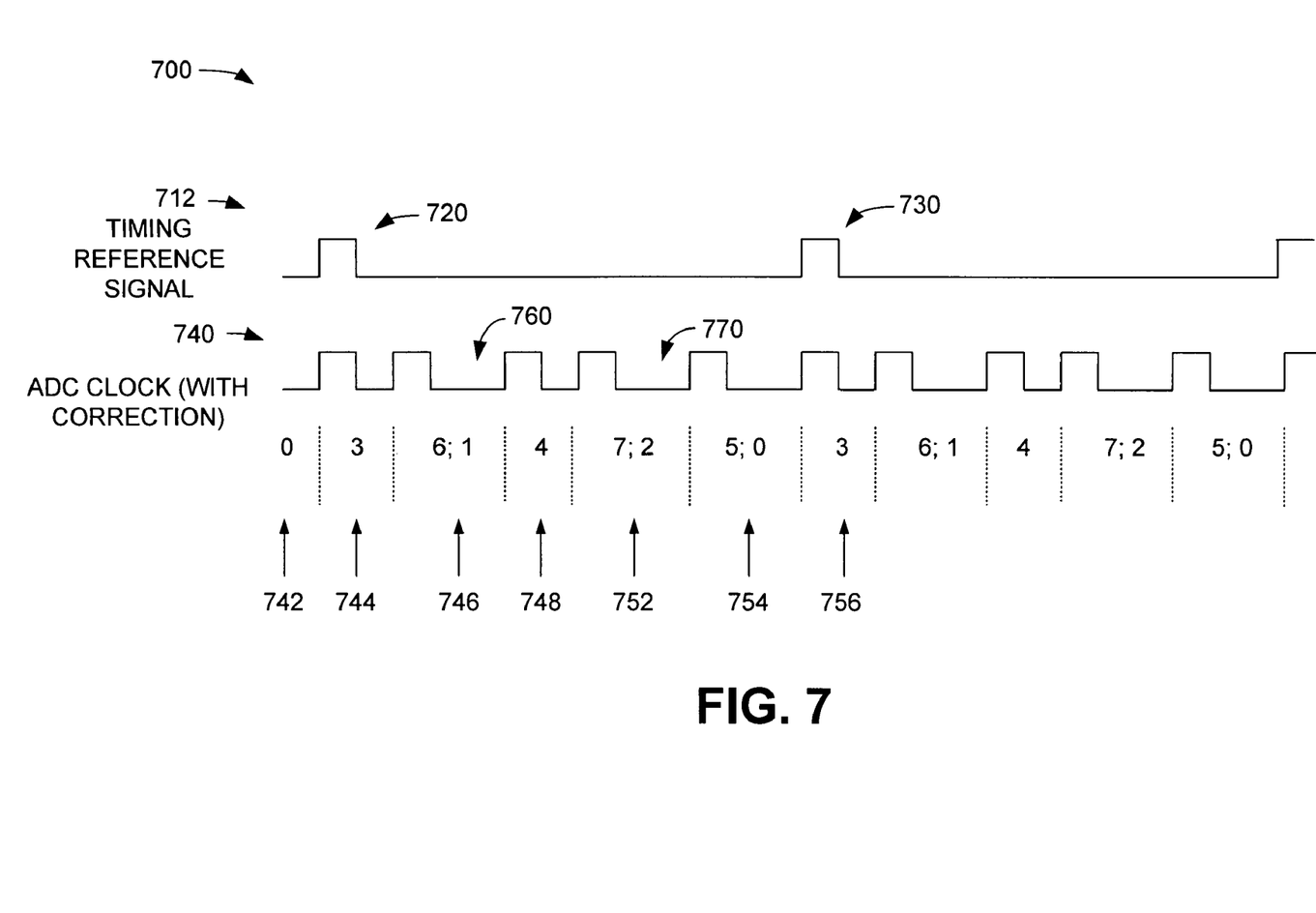
FIG. 7 is a timing diagram illustrating the generation of the corrected ADC clock signal.

FIG. 7 is a timing diagram 700 illustrating the generation of the corrected ADC clock signal. The corrected ADC clock signal is generated by the ADC clock generator 300 in the peripheral module 124. The timing reference signal is illustrated using reference numeral 712. The timing reference signal 712 is similar to the timing reference signal 612. The corrected ADC clock signal is shown using reference numeral 740. The corrected ADC clock signal 740 is similar to the corrected ADC clock signal 640. In this example, the threshold value is five (5) and there are three (3) excess local clock cycles at the output of the adder 308 in FIG. 3. In time period 742 (prior to receipt of the first pulse 720) the result (i.e., the running sum) in the adder 322 is zero (0) and at the first ADC clock pulse (time period 744), the remainder value in the adder 322 is three (3). Because the value three does not exceed the threshold value of five, no further action is taken and the ADC clock output on connection 236 (FIG. 3) is represented by the local clock signal.

In the next ADC clock period, i.e., time period 746, three additional excess clock pulses are received in the adder 322, bringing the total excess clock pulses in the adder to six (6). The value of six (6) is compared in the comparator (326 in FIG. 3) with the threshold value of five (5). Because six is greater than five, the ADC clock pulse 760 is extended by one clock cycle and the value of five (5) (the threshold value) is subtracted from the running sum in the adder 322. The ADC clock period is extended by the comparator 326 indicating logic high on connection 334, which instructs the ADC clock logic 336 to extend the ADC clock output signal on connection 236 by one clock cycle. This leaves a remainder of one (1), as shown in the time period 746.

The next ADC clock pulse begins in time period 748, where the beginning number of excess clock cycles is one (1) to which the value three (3) is added, for a total of four (4). The comparator 626 determines that four (4) is not greater than five (5), so the ADC clock pulse in the time period 748 is not extended. In the next time period 752, the excess local clock cycle value of three (3) is added to the four (4) remaining for a total of seven (7). The comparator determines that the value seven (7) is greater than the value five (5), and extends the ADC clock pulse 770 by one (1) cycle. This process repeats so that the desired number of ADC clock pulses occur between pulses 720 and 730 of the timing reference signal 712. In this example, the three excess clock cycles at the beginning of the timing reference signal are consumed in the time periods 746, 752 and 754.

As mentioned above, the threshold value is set equal to the number of ADC clock cycles that occur between cycles of the timing reference signal. In a practical implementation, the number of excess clock cycles will be between zero and 2000. Therefore, up to 2000 clock cycles are to be consumed between cycles of the timing reference signal. In this implementation, the threshold is set to approximately 8000. The number of ADC clock cycles is approximately 123,000, over which a maximum number of approximately 2000 excess ADC clock cycles are to be consumed. Because the number of ADC clock cycles significantly exceeds the number of excess ADC clock cycles sought to be consumed, a number of ADC clock cycles (15 in this implementation) are grouped together. In this manner, the number of ADC clock cycles that are analyzed to determine whether there are any excess ADC clock cycles to consume is reduced by a factor of, in this example, 15. This reduces the processing resources used to determine the number of excess ADC clock cycles to be consumed. However, extending one ADC clock signal provides sufficient correction to maintain synchronization with the master clock 202.

Due to the carryover of excess local clock cycles, there is virtually no drift in long term synchronization. Once synchronization between the master clock 202 and the local clock 244 is established, there will always be the desired number of ADC clock cycles between pulses in the timing reference signal. Further, drift between the master clock 202 and the local clock 244 is compensated because the extra local clock cycles are measured every timing reference signal period, as the respective oscillators drift relative to each other. This is so because the number of excess clock cycles carried over are analyzed in the following time period.

Figure 8:
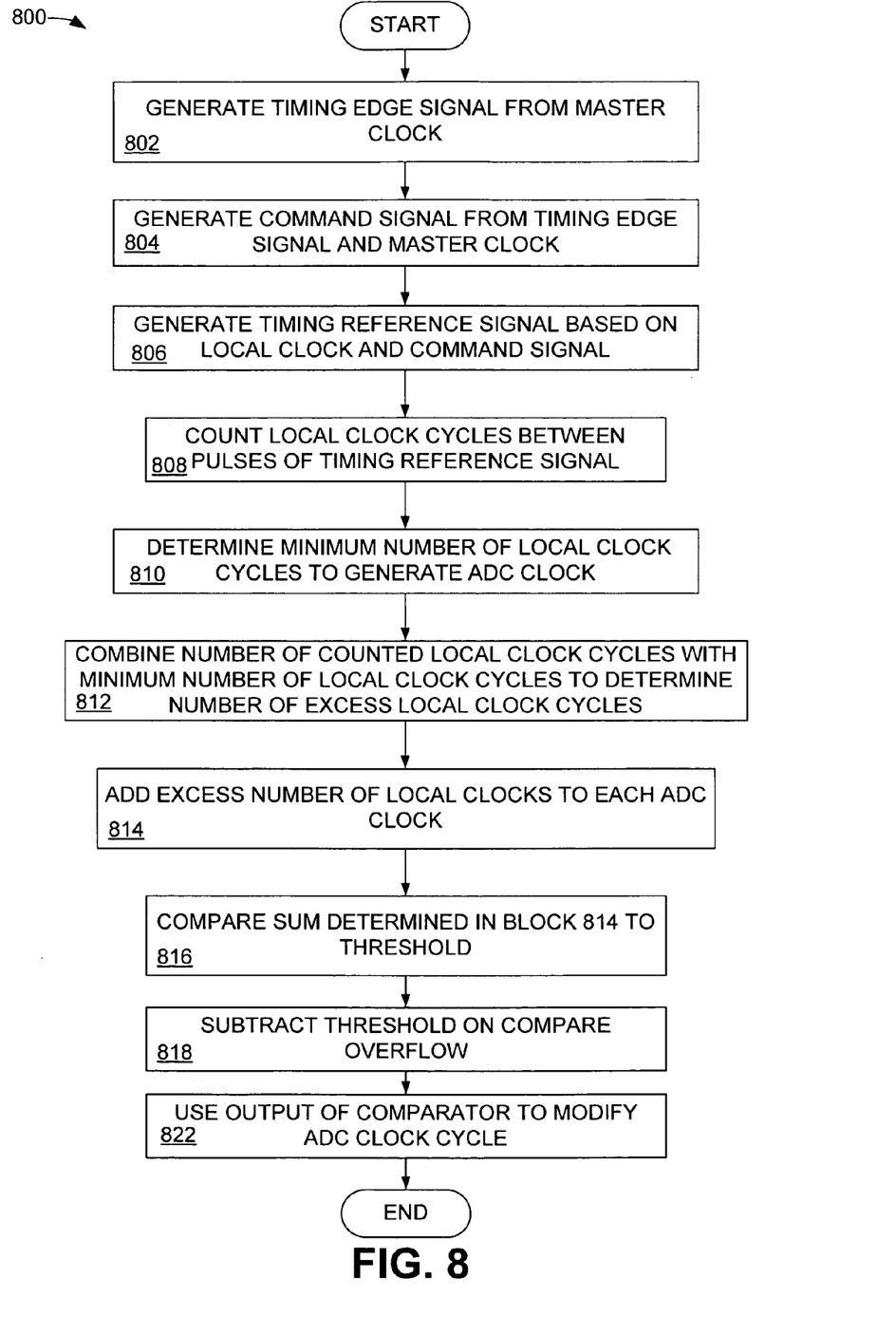
FIG. 8 is a flow chart illustrating the operation of an embodiment of the timing synchronization system.

FIG. 8 is a flow chart illustrating the operation of an embodiment of the timing synchronization system. The blocks in the flowchart need not be performed in the order shown. In block 802, the timing edge signal 404 is generated by the timing command generator 206. In block 804, the command signal 406 is generated by the timing command generator 206 from the timing edge signal 404 and the master clock signal 402. In block 806, the timing reference signal 512 is generated by the command interpreter 232 using the local clock signal 508 and the command signal 506.

In block 808, the counter 302 determines the number of local clock cycles that occur between pulses of the timing reference signal 612. The timing reference signal 612 is used to read the final count from a previous period and to then initialize (zero) the counter 302 and begin counting the next period. In this manner, each timing reference signal pulse is measured.

In block 810, the minimum number of local clock cycles is determined based on the specifications of the oscillators 202 and 244 that generate the master clock signal and the local clock signal, respectively, and the requirement of the ADC 242 (FIG. 2). In block 812, the adder 308 subtracts the minimum number of local clock cycles from the counted local clock cycles to determine a number of excess local clock cycles.

In block 814, the register 322 adds the excess local clock cycles to each ADC clock cycle. The signal on connection 314 represents the number of excess clock cycles that will be apportioned over the time between cycles of the timing reference signal. The number of excess local clock cycles is determined for each timing reference signal pulse. An excess local clock cycle is apportioned by adding it to one of the ADC clock cycles, thus extending the period of the ADC clock cycle by one cycle.

In block 816, the comparator 326 compares the sum determined in block 814 to a threshold value. When the sum in the register 322 reaches the threshold value, the ADC clock cycle is extended by an extra local clock cycle for that ADC clock cycle period. In block 818, the threshold value is subtracted from the register 322 when the output of the comparator 326 is logic high. After the value of the register 322 is reduced by the threshold value, any remainder (remaining excess local clock cycles) in the register 322 is retained in the register 322 and applied to a subsequent cycle.

In block 822, when the output of the comparator 326 is logic high, the output of the comparator 326 on connection 334 causes the ADC clock logic 336 to apportion the excess local clock cycle over an ADC clock cycle.

The foregoing detailed description has been given for understanding exemplary implementations of the invention and no unnecessary limitations should be understood therefrom as modifications will be obvious to those skilled in the art without departing from the scope of the appended claims and their equivalents.

What is claimed is:

1. A system for synchronizing clock signals in an analytical device, comprising:
   a first module including a timing command generator configured to generate a command signal, the command signal related to a master clock signal;
   a second module including a command interpreter configured to generate a timing reference signal related to the command signal and a local clock signal, wherein the second module includes a clock generator configured to receive the timing reference signal and the local clock signal and is configured to adjust a timing output of the second module so that the timing of the second module is synchronized to the master clock signal;

a counter configured to determine a number of pulses of the local clock signal that occur between a first pulse and second pulse of the timing reference signal;

an adder configured to determine a difference between the number of pulses of the local clock signal that occur between the first pulse and second pulse of the timing reference signal and a minimum number of local clock cycles to generate an ancillary (ADC) clock signal, the difference representing a number of excess local clock cycles;

a register configured to add the excess local clock cycles to the ancillary (ADC) clock signal and provide a first result; and a comparator configured to compare the output of the register with a threshold value, wherein when the output of the register exceeds the threshold value, the comparator causes the ancillary (ADC) clock signal to be extended and causes the threshold value to be subtracted from the register, wherein any remainder in the register is applied to a subsequent ancillary (ADC) clock signal cycle.

2. The system of claim 1, wherein the subsequent ancillary (ADC) clock signal is synchronized to the master clock signal.

3. The system of claim 2, wherein the excess local clock cycles are apportioned between pulses of the timing reference signal.

4. The system of claim 3, wherein one of a plurality of ancillary (ADC) clock signals is extended when the output of the register exceeds the threshold value.

5. The system of claim 1, wherein the analytical device comprises a gas chromatograph and the ancillary (ADC) clock signal is part of a detector.

6. The system of claim 1, in which a timing edge of the command signal aligns with a pulse associated with the master clock signal, and in which a pulse associated with the timing reference signal occurs on an edge of the local clock signal following the timing edge signal.

7. A system for synchronizing clocks in an analytical device, comprising:

a timing command generator configured to generate a command signal, the command signal related to a master clock signal;

a command interpreter configured to generate a timing reference signal related to the command signal and a local clock signal;

a counter configured to determine a number of pulses of the local clock signal that occur between a first and second pulse of the timing reference signal;

an adder configured to determine a difference between the number of pulses of the local clock signal that occur between a first pulse and a second pulse of the timing reference signal and a minimum number of local clock cycles to generate an ancillary (ADC) clock signal, the difference representing a number of excess local clock cycles;

a register configured to add the excess local clock cycles to the ancillary (ADC) clock signal and provide a first result; and a comparator configured to compare the output of the register with a threshold value, wherein when the output of the register exceeds the threshold value, the comparator causes the ancillary (ADC) clock signal to be extended and causes the threshold value to be subtracted from the register, wherein any remainder in the register is applied to a subsequent ancillary (ADC) clock signal cycle.

8. The system of claim 7, wherein the subsequent ancillary (ADC) clock signal is synchronized to the master clock signal.

9. The system of claim 8, wherein the excess local clock cycles are apportioned between pulses of the timing reference signal.

10. The system of claim 9, wherein one of a plurality of ancillary (ADC) clock signals is extended when the output of the register exceeds the threshold value.

11. The system of claim 7, wherein the analytical device comprises a gas chromatograph and the ancillary (ADC) clock signal is part of a detector.

12. The system of claim 7, in which a timing edge of the command signal aligns with a pulse associated with the master clock signal, and in which a pulse associated with the timing reference signal occurs on an edge of the local clock signal following the timing edge signal.

13. A method for synchronizing clocks in an analytical device, comprising:

generating a command signal, the command signal related to a master clock signal;

generating a timing reference signal related to the command signal and a local clock signal;

determining a number of pulses of the local clock signal that occur between a first pulse and a second pulse of the timing reference signal;

determining a minimum number of local clock cycles to generate an ancillary (ADC) clock signal;

determining a difference between the number of pulses of the local clock signal that occur between the first pulse and the second pulse of the timing reference signal and the minimum number of local clock cycles to generate an ancillary (ADC) clock signal, the difference representing a number of excess local clock cycles;

adding the excess local clock cycles to the ancillary (ADC) clock signal to provide a first result; and comparing the first result with a threshold value, wherein when the first result exceeds the threshold value, modifying the ancillary (ADC) clock signal and subtracting the threshold value from the first result; and applying any remainder after the subtraction to a subsequent ancillary (ADC) clock signal cycle.

14. The method of claim 13, wherein the modified ancillary (ADC) clock signal is synchronized to the master clock signal.

15. The method of claim 14, wherein the excess local clock cycles are apportioned between pulses of the timing reference signal.

16. The method of claim 15, wherein one of a plurality of ancillary (ADC) clock signals is extended when the first result exceeds the threshold value.

17. The method of claim 13, wherein the analytical devices comprises a gas chromatograph and the ancillary (ADC) clock signal is a detector.

18. The method of claim 13, in which a timing edge of the command signal aligns with a pulse associated with the master clock signal, and in which a pulse associated with the timing reference signal occurs on an edge of the local clock signal following the timing edge signal.

* * * * *